(12) United States Patent
Ozawa et al.

(10) Patent No.: US 12,196,325 B2
(45) Date of Patent: Jan. 14, 2025

(54) COMPRESSION RING

(71) Applicant: TPR Co., Ltd., Tokyo (JP)

(72) Inventors: Takashi Ozawa, Tokyo (JP); Akira Hikone, Tokyo (JP); Takashi Oguro, Tokyo (JP)

(73) Assignee: TPR Co., Ltd., Tokyo (JP)

( * ) Notice: Subject to any disclaimer, the term of this patent is extended or adjusted under 35 U.S.C. 154(b) by 0 days.

(21) Appl. No.: 18/275,050

(22) PCT Filed: Jan. 25, 2022

(86) PCT No.: PCT/JP2022/002621
§ 371 (c)(1),
(2) Date: Jul. 31, 2023

(87) PCT Pub. No.: WO2022/168668
PCT Pub. Date: Aug. 11, 2022

(65) Prior Publication Data
US 2024/0110625 A1    Apr. 4, 2024

(30) Foreign Application Priority Data
Feb. 5, 2021    (JP) ................... 2021-017809

(51) Int. Cl.
*F16J 9/20*    (2006.01)
(52) U.S. Cl.
CPC ...................... *F16J 9/20* (2013.01)
(58) Field of Classification Search
CPC ...................... F16J 9/20; F16J 9/21
See application file for complete search history.

(56) References Cited

FOREIGN PATENT DOCUMENTS

| EP | 1 337 766 B1 | 3/2008 |
|---|---|---|
| JP | S5322680 Y2 * | 11/1974 |
| JP | 53-22680 | 6/1978 |
| JP | 64-8553 | 1/1989 |
| JP | 2-98262 | 8/1990 |

(Continued)

OTHER PUBLICATIONS

Search Report in International Application No. PCT/JP2022/002621 dated Apr. 5, 2022, 2 pages.

(Continued)

*Primary Examiner* — Jacob M Amick
*Assistant Examiner* — Charles J Brauch
(74) *Attorney, Agent, or Firm* — MARSHALL, GERSTEIN & BORUN LLP

(57) ABSTRACT

An outer peripheral surface of a compression ring includes a barrel curved surface, in a case where a width of the outer peripheral surface in an axial direction of the compression ring is set as L1, a condition of 0.2 mm≤½×L1 is satisfied, and in a case where a distance in a radial direction of the compression ring between an outer peripheral peak and each of two points on the barrel curved surface separate from the outer peripheral peak by 0.1 mm in the axial direction of the compression ring is set as d1, and a distance in the radial direction of the compression ring between the outer peripheral peak and each of two points on the barrel curved surface separate from the outer peripheral peak by ¼×L1 in the axial direction of the compression ring is set as d2, a condition of d1<d2 is satisfied.

5 Claims, 4 Drawing Sheets

(56) References Cited

FOREIGN PATENT DOCUMENTS

| | | | |
|---|---|---|---|
| JP | 3-144170 | | 6/1991 |
| JP | H03144170 A | * | 6/1991 |
| JP | 2002-39384 | | 2/2002 |
| JP | 2005-273583 | | 10/2005 |
| JP | 2020-106109 A | | 7/2020 |
| WO | WO-2020/050336 A1 | | 3/2020 |
| WO | WO-2020/100564 A1 | | 5/2020 |

OTHER PUBLICATIONS

Extended European Search Report for Application No. 22749543.9, dated Nov. 8, 2024.

* cited by examiner

COMPRESSION RING

TECHNICAL FIELD

The present invention relates to a compression ring.

BACKGROUND ART

An internal combustion engine (engine) to be mounted on a typical automobile employs a configuration in which three piston rings combining two compression rings including a top ring and a second ring and one oil ring are provided at a piston loaded to a cylinder. The top ring, the second ring and the oil ring of these three piston rings are loaded in ring grooves formed on an outer peripheral surface of the piston in this order from an upper side (a combustion chamber side) and slide on a cylinder inner wall surface. The oil ring farthest from the combustion chamber has an oil seal function of preventing oil from flowing out on the combustion chamber side (oil loss through piston) by scraping off extra engine oil (lubricant) attached on the cylinder inner wall surface on a crank side and a function of preventing burn-in of the piston in association with operation of the internal combustion engine by adjusting an oil amount so that a lubricant film is appropriately held on the cylinder inner wall surface. The compression ring has a gas seal function of preventing a combustion gas from flowing out on a crankcase side from the combustion chamber side (blow-by) by keeping airtightness and an oil seal function of preventing oil loss through piston by scraping off extra oil that cannot be scraped off by the oil ring. Such a combination of the piston rings is used to achieve reduction of a blow-by gas in the internal combustion engine and reduction of oil consumption.

In the internal combustion engine for four-wheeled passenger car assumed to be used in a high revolution range, a top ring having an outer peripheral surface in a vertically symmetric barrel shape is employed to reduce friction occurring between an outer peripheral surface of the top ring and a cylinder inner wall and reduce friction loss in the internal combustion engine. In association with this, Patent document 1 discloses making a curvature radius of a vertically central portion of an outer peripheral surface larger than a curvature radius of portions on both sides of the vertically central portion in a top ring having the outer peripheral surface in a barrel shape.

CITATION LIST

Patent Literature

[Patent document 1] Japanese Utility Model Laid-Open No. 64-8553
[Patent document 2] Japanese Utility Model Laid-Open No. 53-22680
[Patent document 3] Japanese Patent Laid-Open No. 2005-273583
[Patent document 4] Japanese Utility Model Laid-Open No. 2-98262
[Patent document 5] Japanese Patent Laid-Open No. 2002-39384

SUMMARY OF THE INVENTION

Technical Problem

In recent years, development for achieving a hybrid internal combustion engine and development of an internal combustion engine for range extender are underway. These internal combustion engines often intermittently operate while repeating stoppage and starting. Thus, an oil temperature is difficult to rise, and the internal combustion engines often operate in a high oil viscosity state compared to internal combustion engines in related art. It is therefore desired to reduce friction occurring with a cylinder inner wall even under such conditions and reduce friction loss in the internal combustion engine as performance of the piston ring.

Under conditions of a low oil temperature at which oil viscosity becomes high, it is effective to reduce a contact area between the cylinder inner wall and an outer peripheral surface of the ring and reduce shear resistance of an oil film to reduce friction in a fluid lubricating region with a relatively thick oil film between the cylinder inner wall and the outer peripheral surface of the ring. Thus, in a case of a top ring having an outer peripheral surface in a barrel shape, friction can be reduced in the fluid lubricating region by reducing a curvature radius of the outer peripheral surface. However, by reducing the curvature radius of the outer peripheral surface, a surface pressure of the outer peripheral surface of the ring becomes higher with respect to the cylinder inner wall, and thus, there is a possibility that oil is scraped off unnecessarily, which causes runout of the oil film in a boundary lubricating region where the oil film is thin and the cylinder inner wall is in solid contact with the outer peripheral surface, near top and bottom dead centers of the piston. This leads to concern that friction rather increases.

The present invention has been made in view of the above-described problems, and an object of the present invention is to provide a technique of enabling reduction in friction in a compression ring.

Solution to Problem

To solve the above-described problems, the present invention employs the following configuration. In other words, the present invention is a compression ring to be provided in a ring groove formed in a piston to be loaded to a cylinder of an internal combustion engine, an outer peripheral surface of the compression ring including a barrel curved surface curved so as to be convex outward in a radial direction of the compression ring while including an outer peripheral peak that has a maximum diameter of the compression ring on a cross-section orthogonal to a peripherally longitudinal direction of the compression ring, the barrel curved surface being formed symmetrically in an axial direction of the compression ring about the outer peripheral peak on the cross-section, in a case where a width of the outer peripheral surface in the axial direction of the compression ring is set as L1, a condition of 0.2 mm<½×L1 being satisfied, and, in a case where a distance in the radial direction of the compression ring between the outer peripheral peak and each of two points on the barrel curved surface separate from the outer peripheral peak by 0.1 mm in the axial direction of the compression ring on the cross-section is set as d1, and a distance in the radial direction of the compression ring between the outer peripheral peak and each of two points on the barrel curved surface separate from the outer peripheral peak by ¼×L1 in the axial direction of the compression ring on the cross-section is set as d2, a condition of d1<d2 being satisfied.

Here, the "outer peripheral surface" refers to a surface on which outer peripheral edges of both end surfaces in the axial direction, which specify a width of the piston ring (dimension in the axial direction), contact each other. The "peripherally longitudinal direction" refers to a peripherally longitudinal direction of the piston ring unless otherwise specified. The "radial direction" refers to a radial direction of the piston ring unless otherwise specified. The "axial direction" refers to a direction along a central axis of the piston ring unless otherwise specified. Further, the "barrel shape" refers to a shape of a surface curved so as to be convex outward in the radial direction while including a peak portion that has a maximum diameter in the piston ring, and the "symmetric barrel shape" refers to a barrel shape that is a surface shape symmetric in the axial direction (vertical direction) about the peak portion.

According to the present invention, by reducing a drop d1 at a position of 0.1 mm vertically from the outer peripheral peak in a region in the vicinity of the outer peripheral peak and securing a contact area between the cylinder inner wall and the outer peripheral surface, it is possible to prevent increase in friction in a boundary lubricating region. Meanwhile, by increasing a drop at a position of $\frac{1}{4} \times L1$ vertically from the outer peripheral peak within an oil film forming range in a fluid lubricating region and reducing shear resistance of an oil film, it is possible to reduce friction in the fluid lubricating region. In other words, it is possible to reduce friction in the fluid lubricating region while preventing increase in friction in the boundary lubricating region.

Further, the present invention may be configured so that on the cross-section, the barrel curved surface is divided into a large diameter region including the outer peripheral peak and curved with a first curvature radius and small diameter regions located on both sides of the large diameter region in the axial direction of the compression ring and curved with a second curvature radius smaller than the first curvature radius and so as to satisfy a condition of $0.2 \text{ mm} \leq L2 \leq \frac{1}{2} \times L1$ in a case where a width of the large diameter region in the axial direction of the compression ring is set as L2.

Further, in the present invention, d1 and d2 may be such that $d1 < d2$, $0.05 \text{ μm} \leq d1 \leq 0.7 \text{ μm}$, and $4.0 \text{ μm} \leq d2 \leq 15.0 \text{ μm}$.

Further, in the present invention, on the cross-section, a distance in the axial direction of the compression ring between the outer peripheral peak and a midpoint of the outer peripheral surface in the axial direction of the compression ring may be equal to or less than 0.05 mm.

Further, in the present invention, L1 may be such that $0.8 \text{ mm} \leq L1 \leq 2.5 \text{ mm}$.

Further, in the present invention, the internal combustion engine may be a gasoline engine.

Advantageous Effects of Invention

According to the present invention, it is possible to reduce friction in the compression ring.

DESCRIPTION OF EMBODIMENTS

A preferred embodiment of a compression ring according to the present invention will be described below with reference to the drawings. While the embodiment described below is a compression ring according to the present invention applied to a top ring, this is merely an example, and application of the present invention is not limited to the top ring. The present invention is also applicable to a second ring. Note that a configuration described in the embodiment below is not intended to limit a technical scope of the invention unless otherwise specified.

Figure 1:
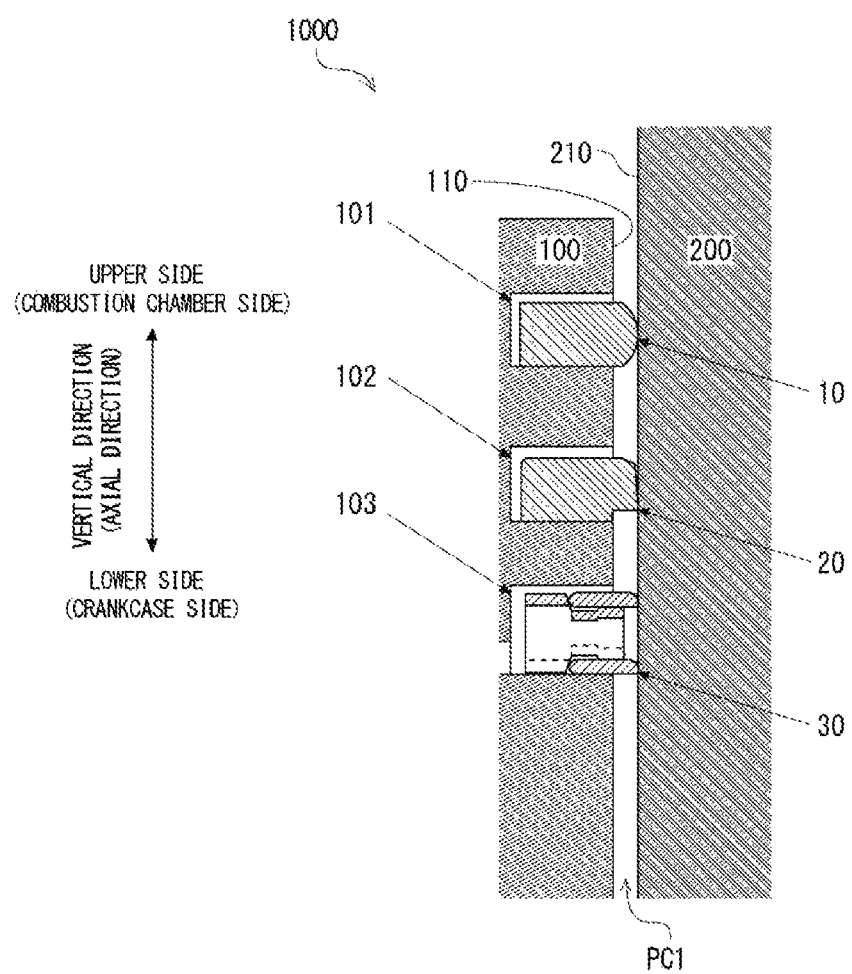
FIG. 1 is an enlarged cross-section view of an internal combustion engine in which a top ring according to an embodiment is provided.

FIG. 1 is an enlarged cross-section view of an internal combustion engine in which a top ring according to the embodiment is provided. As illustrated in FIG. 1, an internal combustion engine 1000 according to the embodiment includes a cylinder 200, and a piston 100 loaded to the cylinder 200.

As illustrated in FIG. 1, in the internal combustion engine 1000, a piston clearance PC1 is formed by a predetermined separation distance being secured between a piston outer peripheral surface 110 and a cylinder inner wall 210. Further, on the piston outer peripheral surface 110, a top ring groove 101, a second ring groove 102, and an oil ring groove 103 are formed in this order from a combustion chamber side at predetermined intervals in an axial direction of the piston 100. The piston outer peripheral surface 110 is partitioned by the top ring groove 101, the second ring groove 102, and the oil ring groove 103. As illustrated in FIG. 1, a top ring 10, a second ring 20, and an oil ring 30 are respectively loaded in the top ring groove 101, the second ring groove 102, and the oil ring groove 103. As illustrated in FIG. 1, a state where each piston ring is loaded in the corresponding ring groove of the piston 100 loaded to the cylinder 200 will be referred to as a "use state". Each piston ring has self tension so that each outer peripheral surface presses the cylinder inner wall 210 in the use state.

Further, in the following description, a "peripherally longitudinal direction" refers to a peripherally longitudinal direction of the piston ring unless otherwise specified. A "radial direction" refers to a radial direction of the piston ring unless otherwise specified. An "axial direction" refers to a direction along a central axis of the piston ring unless otherwise specified. Further, regarding the piston ring, an "outer peripheral surface" refers to a surface on which outer peripheral edges on both end surfaces in the axial direction, which specify a width (dimension in the axial direction) of a ring (or a segment) contact each other, and an "inner peripheral surface" refers to a surface on which inner peripheral edges on the both end surfaces in the axial direction contact each other.

Here, an arrow in FIG. 1 represents a vertical direction. In the present specification, a combustion chamber side is defined as an "upper side", and a crankcase side is defined as a "lower side" regarding the internal combustion engine 1000. Further, an axial direction of each of the piston 100, the cylinder 200, the top ring 10, the second ring 20, and the oil ring 30 is defined as a vertical direction, the combustion chamber side when they are in the use state is defined as an "upper side", and an opposite side (that is, a side separate from the combustion chamber, which is the crankcase side) is defined as a "lower side".

Further, in the present specification, a "barrel shape" refers to a surface shape that is curved so as to be convex outward in the radial direction while including a peak portion that has a maximum diameter in the piston ring, and a "symmetric barrel shape" refers to a barrel shape that is a surface shape symmetric in the axial direction (vertical direction) about the peak portion. As illustrated in FIG. 1, the internal combustion engine 1000 according to the embodiment employs a combination of piston rings including the top ring 10 having an outer peripheral surface in a symmetric barrel shape, the second ring 20 having an undercut shape in which a lower portion of an outer peripheral portion is cut out, and the oil ring 30 including a pair of segments (side rails) 30a, 30a, and an expander spacer 30b that biases the pair of segments outward (to the cylinder inner wall 210) in the radial direction. However, the present invention is not limited to this.

Figure 2:
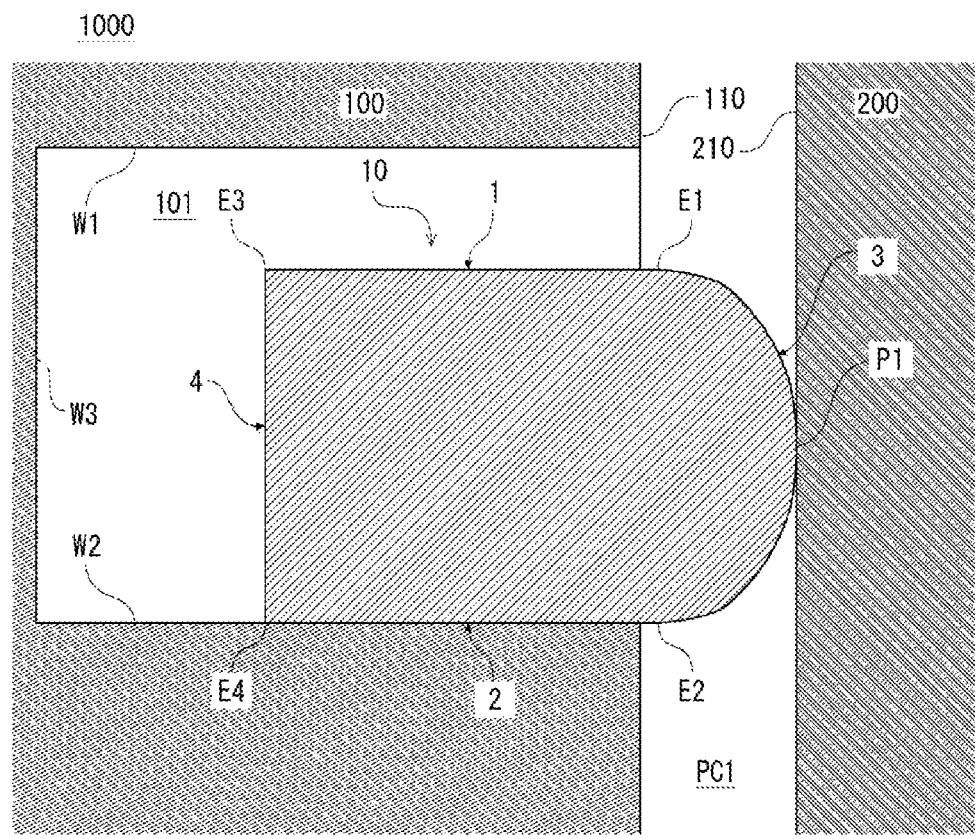
FIG. 2 is an enlarged cross-section view of a portion near a top ring groove of the internal combustion engine in which the top ring according to the embodiment is provided.
Figure 2:
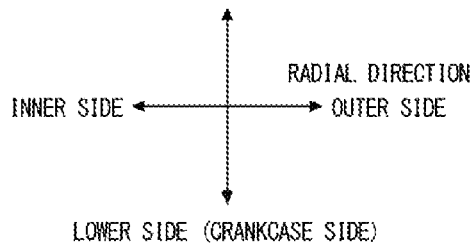

The top ring 10 according to the embodiment will be described in detail below. FIG. 2 is an enlarged cross-section view of a portion near the top ring groove 101 of the internal combustion engine 1000 in which the top ring 10 according to the embodiment is provided. As illustrated in FIG. 2, the top ring groove 101 is formed by a pair of inner walls that vertically face each other, and between these, the inner wall on the upper side will be referred to as an upper wall W1, and the inner wall on the lower side will be referred to as a lower wall W2. As illustrated in FIG. 2, the top ring 10 includes an upper surface 1 provided on the upper side, a lower surface 2 provided on the lower side, an outer peripheral surface 3 that connects an outer peripheral edge E1 on the upper surface 1 and an outer peripheral edge E2 on the lower surface 2, and an inner peripheral surface 4 that connects an inner peripheral edge E3 on the upper surface 1 and an inner peripheral edge E4 on the lower surface 2. When the top ring 10 is loaded in the top ring groove 101, that is, the top ring 10 is in the use state, the upper surface 1 is located on the upper side and faces the upper wall W1 of the top ring groove 101, the lower surface 2 is located on the lower side and faces the lower wall W2, and the outer peripheral surface 3 is in sliding contact with the cylinder inner wall 210.

Figure 3:
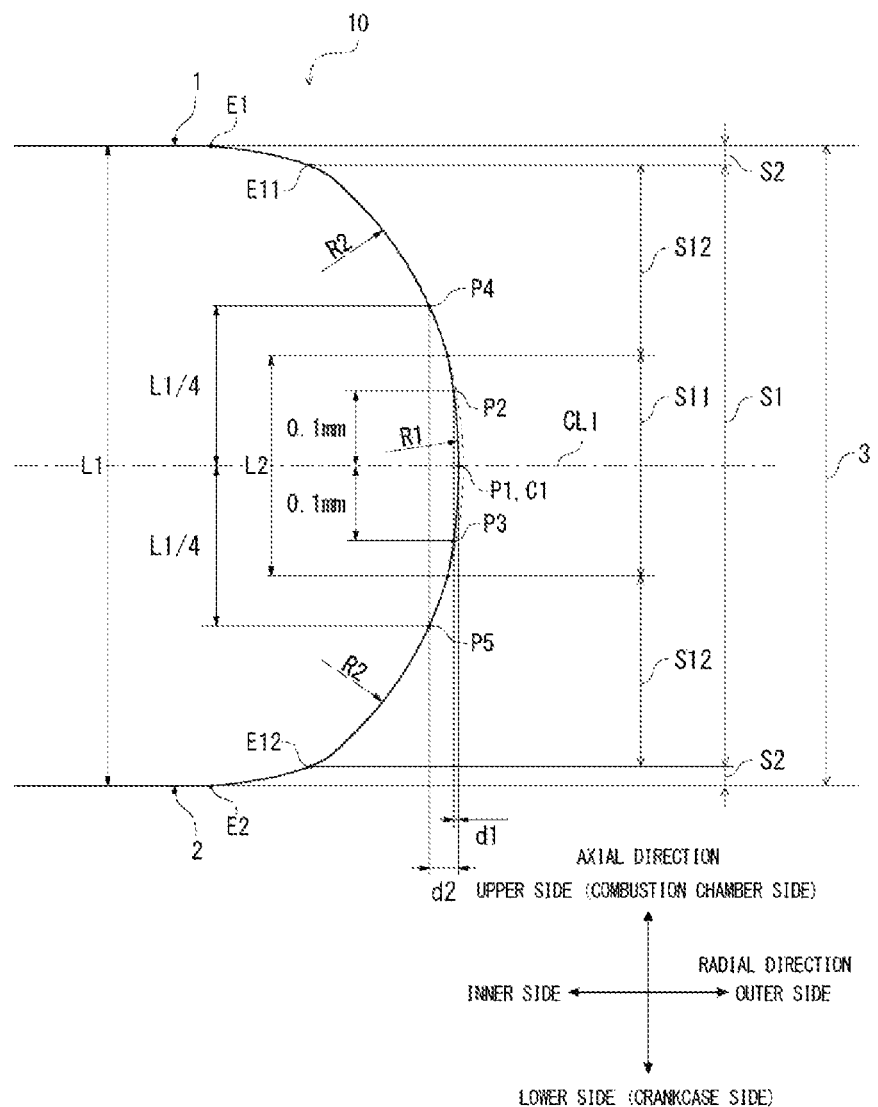
FIG. 3 is an enlarged cross-section view of a portion near an outer peripheral surface of the top ring.

FIG. 3 is an enlarged cross-section view of a portion near the outer peripheral surface 3 of the top ring 10. A reference numeral CL1 in FIG. 3 indicates a line (central line) that passes through a center of a width in the vertical direction (axial direction) of the top ring 10. As illustrated in FIG. 3, the outer peripheral surface 3 includes a barrel curved surface S1 provided at an outer peripheral end portion of the top ring 10, and a pair of connection surfaces S2, S2 that respectively connect the barrel curved surface S1, and the upper surface 1, and the lower surface 2. One of the pair of connection surfaces S2, S2 connects a peripheral edge (hereinafter, an upper edge) E11 on the upper side (combustion chamber side) of the barrel curved surface S1 and an outer peripheral edge E1 of the upper surface 1. The other of the pair of connection surfaces S2, S2 connects a peripheral edge (hereinafter, a lower edge) E12 on the lower side (the crankcase side 40) of the barrel curved surface S1 and the outer peripheral edge E2 of the lower surface 2. The pair of connection surfaces S2, S2 are formed vertically symmetrically about the central line CL1.

As illustrated in FIG. 3, the barrel curved surface S1 is formed in a barrel shape. In other words, the barrel curved surface S1 is curved with a predetermined curvature radius so as to be convex outward in the radial direction while including an outer peripheral peak P1 that has a maximum diameter in the top ring 10 on a cross-section orthogonal to the peripherally longitudinal direction of the top ring 10. The outer peripheral peak P1 on the barrel curved surface S1 is located outermost in the radial direction of the top ring 10 on the outer peripheral surface 3, and the barrel curved surface S1 is in sliding contact with the cylinder inner wall 210 in the use state. In the present embodiment, the outer peripheral peak P1 is located on the central line CL1 and coincides with a midpoint C1 of the outer peripheral surface 3 in the vertical direction (axial direction). Further, the barrel curved surface S1 is formed in a symmetric barrel shape. In other words, the barrel curved surface S1 is formed vertically symmetrically about the outer peripheral peak P1 on the cross-section orthogonal to the peripherally longitudinal direction. Here, a width of the outer peripheral surface 3 in the vertical direction is set as L1. In this event, the top ring 10 is configured so as to satisfy a condition of 0.2 mm<½×L.

As illustrated in FIG. 3, on the cross-section orthogonal to the peripherally longitudinal direction of the top ring 10, the barrel curved surface S1 is divided into a large diameter region S11 and a pair of small diameter regions S12, S12 having different curvature radii. The large diameter region S11 includes the outer peripheral peak P1 and is curved with a first curvature radius R1. The pair of small diameter regions S12, S12 are located on both sides of the large diameter region S11 so that the large diameter region S11 is put between the small diameter regions S12, S12 in the vertical direction and are curved with a second curvature radius R2 smaller than R1. In other words, R2<R1. Here, a width of the large diameter region S11 in the vertical direction is set as L2. In this event, the top ring 10 is configured to satisfy a condition of 0.2 mm≤L2≤½×L1.

Here, reference numerals P2 and P3 in FIG. 3 indicate two points on the barrel curved surface S1 separate from the outer peripheral peak P1 by 0.1 mm in the vertical direction. The point P2 out of the two points is a point on the upper side (combustion chamber side), and the point P3 out of the two points is a point on the lower side (crankcase side). The points P2 and P3 are located on the large diameter region S11. Further, reference numerals P4 and P5 in FIG. 3 indicate two points on the barrel curved surface S1 separate from the outer peripheral peak P1 by ¼×L1 in the vertical direction. The point P4 out of the two points is a point on the upper side, and the point P5 out of the two points is a point on the lower side. The point P4 is located on the small diameter region S12 on the upper side, and the point P5 is located on the small diameter region S12 on the lower side. Further, a distance in the radial direction between each of the points P2 and P3 and the outer peripheral peak P1 is set as a drop d1, and a distance in the radial direction between each of the points P4 and P5 and the outer peripheral peak P1 is set as a drop d2. In this event, the top ring 10 is configured to satisfy a condition of d1<d2.

Here, typically, under conditions of a low oil temperature at which oil viscosity becomes high, friction increases in the fluid lubricating region where a relatively thick oil film between the cylinder inner wall and the ring outer peripheral surface becomes large. To reduce friction in the fluid lubricating region, it is effective to reduce a contact area between the cylinder inner wall and the ring outer peripheral surface and reduce shear resistance of the oil film. Meanwhile, if the contact area between the cylinder inner wall and the ring outer peripheral surface is reduced, a surface pressure of the ring outer peripheral surface becomes high with respect to the cylinder inner wall. If the surface pressure becomes too high, there is a possibility that oil is scraped off unnecessarily, which causes runout of the oil film in the boundary lubricating region where the oil film is thin and the cylinder inner wall is in solid contact with the outer peripheral surface, near top and bottom dead centers of the piston. Thus, in the top ring having the outer peripheral surface in the barrel shape, in a case where the contact area between the cylinder inner wall and the ring outer peripheral surface is reduced by uniformly reducing a curvature radius of the outer peripheral surface, to reduce friction in the fluid lubricating region, there is concern that friction rather increases due to runout of the oil film in the boundary lubricating region.

To address this, the present inventor has found that in the fluid lubricating region, an oil film forming range (range where a hydraulic pressure is high) is not located in an entire region of the outer peripheral surface but is narrowed around the outer peripheral peak, and further, the hydraulic pressure becomes maximum in the vicinity of the outer peripheral peak. On the basis of this, the present inventor has made a drop in a region adjacent to a region in the vicinity of the outer peripheral peak larger than a drop in the region in the vicinity of the outer peripheral peak. Specifically, in the present embodiment, the top ring 10 is configured so as to satisfy a condition of 0.2 mm<½×L1 and so that the distance d1 in the radial direction between the outer peripheral peak P1 and each of the two points P2 and P3 on the barrel curved surface S1 separate from the outer peripheral peak P1 by 0.1 mm in the vertical direction (axial direction), and the distance d2 in the radial direction between the outer peripheral peak P1 and each of the two points P4 and P5 on the barrel curved surface S1 separate from the outer peripheral peak P1 by ¼×L1 in the vertical direction satisfy a condition of d1<d2. According to this configuration, by securing a contact area between the cylinder inner wall 210 and the outer peripheral surface 3 by reducing the drop d1 at a position of 0.1 mm vertically from the outer peripheral peak P1 in a region in the vicinity of the outer peripheral peak P1, it is possible to prevent increase in friction in the boundary lubricating region. On the other hand, by reducing shear resistance of the oil film by increasing the drop at the position of ¼×L1 vertically from the outer peripheral peak P1 within the oil film forming range in the fluid lubricating region, it is possible to reduce friction in the fluid lubricating region. In other words, it is possible to reduce friction in the fluid lubricating region while preventing increase in friction in the boundary lubricating region.

Further, in the present embodiment, the top ring 10 is configured such that the barrel curved surface S1 is divided into the large diameter region S11 including the outer peripheral peak P1 and curved with a first curvature radius R1, and small diameter regions S12 located on both sides of the large diameter region S11 in the vertical direction (axial direction) and curved with a second curvature radius R2 smaller than the first curvature radius R1, and a width L2 of the large diameter region S11 in the vertical direction satisfies a condition of 0.2 mm≤L2≤½×L1. In other words, the top ring 10 is configured so that the two points P2 and P3 on the barrel curved surface S1, which are measurement positions of d1 and which are separate from the outer peripheral peak P1 by 0.1 mm, are located on the large diameter region S11, and the two points P4 and P5 on the barrel curved surface S1, which are measurement positions of d2 and which are separate from the outer peripheral peak P1 by ¼×L1, are located on the small diameter regions S12 by setting a vertical width of the large diameter region S11 with a large curvature radius at equal to or greater than 0.2 mm and equal to or less than ½×L1. This makes it possible to satisfy d1<d2 and can reduce friction. However, the present invention is not limited to this, and R1 may be equal to or substantially equal to R2.

Further, under conditions that d1<d2 is satisfied, d1 and d2 may be set such that 0.05 μm≤d1≤0.7 μm, and 4.0 μm≤d2≤15.0 μm, are preferably set such that 0.05 μm≤d1≤0.7 μm and 6.0 μm≤d2≤15.0 μm and are further preferably set such that 0.05 μm≤d1≤0.7 μm and 8.0 μm≤d2≤15.0 μm. By setting d1 and d2 as described above, friction can be further reduced. However, the present invention is not limited to this.

Further, while in the present embodiment, the midpoint C1 of the outer peripheral surface 3 coincides with the outer peripheral peak P1 on the cross-section orthogonal to the peripherally longitudinal direction of the top ring 10, the midpoint C1 and the outer peripheral peak P1 may be misaligned in the vertical direction. However, a distance in the vertical direction (axial direction) between the midpoint C1 and the outer peripheral peak P1 is preferably set at equal to or less than 0.05 mm and further preferably set at equal to or less than 0.02 mm.

Further, L1 is preferably set such that 0.8 mm≤L1≤2.5 mm, and is further preferably set such that 1.0 mm≤L1≤1.5 mm. However, the present invention is not limited to this.

Further, the outer peripheral surface of the compression ring according to the present invention may have a hard coating including at least one layer among a PVD processing film, a DLC film, and a chrome plating processing film. This can reduce friction force on the outer peripheral surface of the compression ring and improve abrasion resistance. Note that the "physical vapor deposition (PVD) processing film" refers to a coating formed using a PVD method. The PVD method is one type of a vapor-deposition method of forming a film on a surface of an opposite material by attaching particles emitted from a target and is also referred to as physical vapor deposition. Further, a "diamond like carbon (DLC) film" refers to an amorphous hard carbon film mainly constituted with allotropes of carbon hydride and carbon. Still further, the "chrome plating processing film" refers to a coating formed through chrome plating.

Further, the compression ring according to the present invention is preferably provided in a gasoline engine. However, an internal combustion engine to which the compression ring according to the present invention is to be applied is not limited to the gasoline engine. The internal combustion engine may be a diesel engine.

[Hydraulic Experiment]

An experiment of measuring a hydraulic pressure between the cylinder inner wall and the outer peripheral surface of the top ring in the fluid lubricating region was performed. Experiment machine used in the present experiment has an internal combustion engine structure with a bore diameter of 86 mm and a stroke of 60 mm. In the present experiment, the experiment machine was operated in each of experimental examples 1 to 3 described later, and distribution of hydraulic pressures between the cylinder inner wall and the outer peripheral surface of the top ring was measured. Experiment conditions were such that crank rotation speed was set at 1200 rpm, and an oil temperature was set at 80° C.

EXPERIMENTAL EXAMPLES

In the experimental examples 1 to 3, a top ring having an outer peripheral surface in a symmetric barrel shape was used. The outer peripheral peak P1 in the experimental examples 1 to 3 is located at a vertical center of the outer peripheral surface 3. In the experimental examples 1 to 3, L1 was set at 1.2 mm, and a magnitude of d2 was made different. d2 is a drop at a position of 0.3 mm (¼×L1) vertically from the outer peripheral peak P1 located at the vertical center of the outer peripheral surface 3. d2 was set at 15 m in the experimental example 1, d2 was set at 8 m in the experimental example 2, and d2 was set at 4 m in the experimental example 3. Note that the present invention is not limited by the experimental examples.

[Experimental Results]

Figure 4:
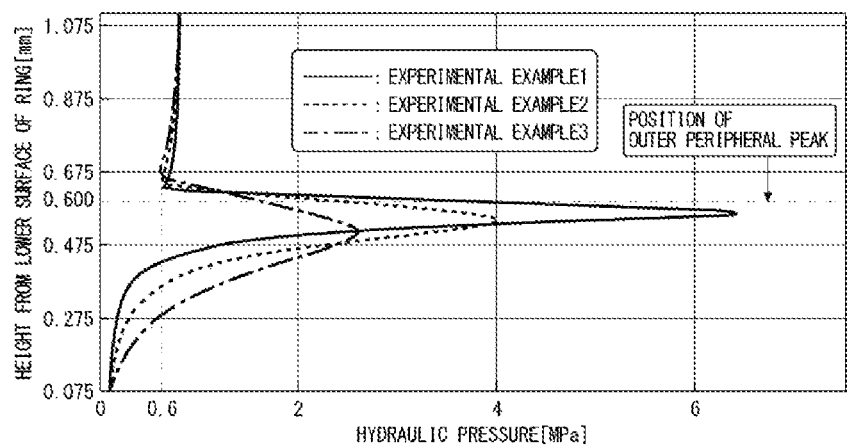
FIG. 4 is a view illustrating distribution of hydraulic pressures in experimental examples 1 to 3.

FIG. 4 is a view illustrating distribution of hydraulic pressures in the experimental examples 1 to 3. FIG. 4 illustrates distribution of hydraulic pressures at a crank angle of 77° that is a midpoint of the piston stroke in which piston speed becomes maximum in a descending stroke. A graph in FIG. 4 indicates a height from the lower surface of the top ring on a vertical axis and indicates a hydraulic pressure on a horizontal axis. As can be seen from the experimental examples 1 to 3 in FIG. 4, it can be confirmed that the oil film forming range with the hydraulic pressure in the fluid lubricating region of equal to or higher than 0.6 MPa is narrower than the vertical width of the ring. Further, by comparing the experimental examples 1 to 3, it can be confirmed that the oil film forming range is narrowed by increasing d2. By this means, it can be confirmed that in the fluid lubricating region, shear resistance of the oil film can be reduced when the drop at the position vertically separate from the outer peripheral peak P1 by ¼×L1 is increased.

While the preferred embodiment of the present invention has been described above, the above-described various forms can be combined in every possible manner.

REFERENCE SIGNS LIST

1000: internal combustion engine
100: piston
200: cylinder
10: top ring
3: outer peripheral surface
P1: outer peripheral peak
S1: barrel curved surface
S11: large diameter region
S12: small diameter region

The invention claimed is:

1. A compression ring to be provided in a ring groove formed in a piston to be loaded to a cylinder of an internal combustion engine,
   an outer peripheral surface of the compression ring including a barrel curved surface curved so as to be convex outward in a radial direction of the compression ring while including an outer peripheral peak that has a maximum diameter of the compression ring on a cross-section orthogonal to a peripherally longitudinal direction of the compression ring, the barrel curved surface being formed symmetrically in an axial direction of the compression ring about the outer peripheral peak on the cross-section,
   in a case where a width of the outer peripheral surface in the axial direction of the compression ring is set as L1, a condition of 0.2 mm<½×L1 being satisfied, and
   in a case where a distance in the radial direction of the compression ring between the outer peripheral peak and each of two points on the barrel curved surface separate from the outer peripheral peak by 0.1 mm in the axial direction of the compression ring on the cross-section is set as d1, and a distance in the radial direction of the compression ring between the outer peripheral peak and each of two points on the barrel curved surface separate from the outer peripheral peak by ¼×L1 in the axial direction of the compression ring on the cross-section is set as d2, a condition of d1<d2 being satisfied, wherein on the cross-section, the barrel curved surface is divided into a large diameter region including the outer peripheral peak and curved with a first curvature radius and small diameter regions located on both sides of the large diameter region in the axial direction of the compression ring and curved with a second curvature radius smaller than the first curvature radius, and
   in a case where a width of the large diameter region in the axial direction of the compression ring is set as L2, a condition of 0.2 mm≤L2≤½×L1 is satisfied, and
   the two points on the barrel curved surface separate from the outer peripheral peak by 0.1 mm in the axial direction of the compression ring are located on the large diameter region, and the two points on the barrel curved surface separate from the outer peripheral peak by ¼×L1 in the axial direction of the compression ring are located on the small diameter region.

2. The compression ring according to claim 1, wherein d1<d2, and
0.05 μm≤d1≤0.7 μm, and 4.0 μm≤d2≤15.0 μm.

3. The compression ring according to claim 1, wherein on the cross-section, a distance in the axial direction of the compression ring between the outer peripheral peak and a midpoint of the outer peripheral surface in the axial direction of the compression ring is equal to or less than 0.05 mm.

4. The compression ring according to claim 1, wherein 0.8 mm≤L1≤2.5 mm.

5. The compression ring according to claim 1, wherein the internal combustion engine is a gasoline engine.

* * * * *